Jan. 13, 1953      R. C. TRUAX      2,625,007
ROCKET MOTOR COOLING SYSTEM
Filed Feb. 7, 1951
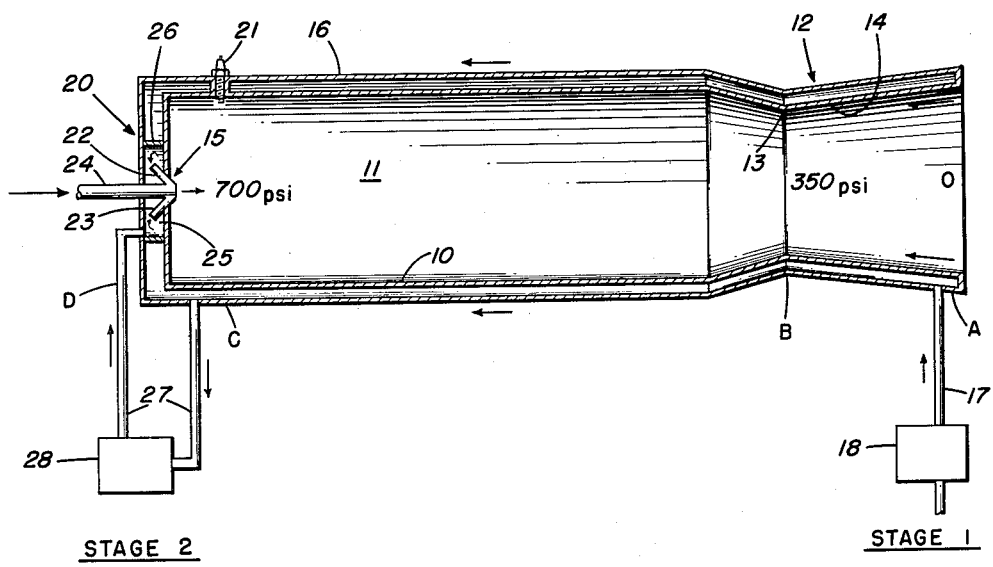
STAGE 2                    STAGE 1
INVENTOR.
ROBERT C. TRUAX
BY
ATTORNEYS Patented Jan. 13, 1953

2,625,007

UNITED STATES PATENT OFFICE 2,625,007

ROCKET MOTOR COOLING SYSTEM

Robert C. Truax, United States Navy

Application February 7, 1951, Serial No. 209,891

5 Claims. (Cl. 60—35.6)

(Granted under Title 35, U. S. Code (1952), sec. 266)

This invention relates to engine cooling systems and more particularly to a cooling system as applied to the rocket type internal combustion engine.

In many rocket type internal combustion engines it is customary to employ at least one component of the fuel as a coolant by passing it through the jacketed wall around the engine combustion chamber, the coolant-fuel traversing the combustion chamber jacket from an inlet point adjacent the engine discharge nozzle to a point at the other end of the chamber adjacent the fuel injector. In order to obtain a forced flow and an adequate head at the injector a pressure device such as a pump is normally introduced into the fuel line at the source. This gives rise to a high pressure in the cooling system due to the requirement of a high injection pressure into the combustion chamber. For example, a usual combustion chamber inlet pressure is 700 pounds per square inch (p. s. i.), and to obtain this pressure a pump pressure at the jacket inlet must be around 900 p. s. i. This results in high pressure differentials across the inner jacket wall, at the discharge nozzle where critical stresses are usually encountered, the average pressure differential amounting to something like 500 pounds across the inner wall at this point, assuming that the pressure in the discharge nozzle is 350 pounds and that in the jacket is 850 pounds.

One of the main objects of the invention, therefore, is to reduce pressure differentials across the jacket wall of a rocket type internal combustion chamber in which a fuel component is used as the coolant. Another object is to make possible a substantial reduction in weight or an increase in size of a rocket engine of this type by reduction in the thickness required for the jacket wall. Still another object is to reduce the strain at critically stressed points in the jacket wall.

Other objects and features of the invention will appear on consideration of the following detailed description of the invention as illustrated in the accompanying figure in which an improved pressure distribution is indicated for carrying out the above objects.

Referring to the figure, an axial section is shown of a rocket type internal combustion engine having a main generally cylindrical wall 10 enclosing a combustion chamber 11, a discharge nozzle 12 including the constricted throat 13 and expanded section 14, and a fuel injector 15.

A cooling jacket 16 surrounds the entire chamber and discharge nozzle wall, forming a channel or passage for the coolant-fuel introduced adjacent the nozzle end of the jacket through tube 17. A first stage pump 18 supplies the fuel inlet pressure into the jacket through tube 17. At the other or fuel injector end 20 of the combustion chamber the central and axially placed inlet nozzle 15 supplies the coolant-fuel to the interior of the combustion chamber, an igniting device 21 being inserted through the combustion chamber wall, as indicated. The injector 15 may take the form of two converging ducts 22 and 23 and an axial duct 24 leading into the nozzle 15, the last named duct extending outside the jacket 16. A chamber 25 is formed in the jacket about the nozzle by means of annular partition 26, and the outer open ends of converging ducts 22 and 23 terminate in this jacket chamber. A tube 27 is connected between the chamber 25 and the jacket 16 at the injection end of the combustion chamber, with a second stage pump 28 interposed in the circuit of tube 27 so that a flow of coolant-fuel is set up from the jacket 16 into chamber 25 with an increase of pressure to that required for injection through the nozzle 15 into the combustion chamber of the engine which may be operating under a pressure in the neighborhood of 700 pounds. Nozzle duct 24 is employed to supply another fuel component for addition to the coolant-fuel, but this addition is not always essential and may be omitted.

The jacket pressure condition of the engine may now be analyzed having in mind that the area of greatest stress is in the constricted region B of the discharge nozzle. Assuming an operating pressure of around 700 pounds per square inch in the combustion chamber in the region C adjacent the fuel injector 15 the fuel pressure at D delivered by the second stage pump 28 should be about 800 pounds. To obtain this final pressure the coolant-fuel pressure may be raised by the first stage pump 18 to only about 400 pounds in the jacket at the discharge nozzle end A. This pressure drops to around 350 pounds in the region B at the nozzle constriction and to about 300 pounds in the region C around the injector end of the combustion chamber. Here the pressure is raised to about 800 pounds by the second pressure stage pump 28 and is then reduced thru the injector nozzle to the 700 pounds prevailing in the combustion chamber. Accordingly the highest differential pressure across the jacket wall along the path of the coolant-fuel is about 400 pounds, occurring at regions A and C, assuming a pressure drop in the combustion gases to 350 pounds at the throat B, and to 0 at the region A. Thus the differential across the inner jacket wall at the throat B drops to 0 and stresses at this critical point are eliminated. This obviously compares favorably with a differential pressure of about 500 pounds at B for a single stage pump system where for an equivalent engine the coolant-fuel pressure would normally have to be raised to 900 pounds at A and would be about 850 pounds at B.

While two pressure stages are shown obviously more stages may be employed, the essential idea being a break-down of final required pressure built up from a single stage, to distributed stages with accumulative increase in pressures to the final, in the passage of the coolant from the discharge nozzle end of the jacket to the injector end.

The present engine system not only eliminates the differential pressure across the inner jacket wall at the crucial region B, but further reduces differential pressures at all regions A, B and C across both the inner and outer jacket walls by at least 50%, as may be seen by a glance at the following table:

*Pressure differential table*

| Station | Normal one stage pump system | | Present two stage system | |
|---|---|---|---|---|
| | Inner Shell | Outer Shell | Inner Shell | Outer Shell |
| A | 900 | 900 | 400 | 400 |
| B | 500 | 850 | 0 | 350 |
| C | 100 | 800 | 400 | 300 |

It will thus be seen that by reason of the present improvement rocket engines of this type may obviously be built lighter due to the thinner jacket wall structure permissible with the present arrangement. Also, the maximum size of rocket engines of this type, which was previously limited by an optimum relation between a large diameter and a small thickness of jacket wall at the critical region, may now be considerably increased.

The showing is diagrammatic and modifications may of course be made as indicated above, the invention being circumscribed by the claims as hereto appended.

The invention described herein may be manufactured and used by or for the Government of the United States of America for governmental purposes without the payment of any royalties thereon or therefor.

What is claimed is:

1. A rocket-type internal combustion motor having a fuel injector, a discharge nozzle having a constriction and combustion chamber enclosed by a wall formed by a surface of revolution about the nozzle axis, a jacket forming a fuel conduit and cooling chamber in said wall and about said constriction, a coolant-fuel inlet to the jacket chamber at the discharge nozzle end of said motor, a conduit between said jacket chamber and injector, and apparatus for reducing the external pressure on said nozzle constriction due to coolant-fuel flow in said jacket, comprising means for developing a fraction of the final injection pressure in the fuel supplied through said inlet, and additional means at the injector end of said chamber for developing the balance of the required pressure in said fuel delivered to the injector, said nozzle constriction being located in the coolant-fuel line between said pressure developing means.

2. The internal combustion motor as defined in claim 1, with the pressure developing means at the ends of the combustion chamber consisting of pumps in series pressure cumulative relation in the path of coolant-fuel through the jacket chamber.

3. A rocket-type internal combustion engine comprising a tubular combustion chamber closed at one end and having an enclosing wall, a fuel injector at said one end of said chamber, a discharge nozzle at the other end of said chamber including a constriction, a jacket enclosing the combustion chamber wall and discharge nozzle to provide a cooling chamber, a coolant-fuel inlet to said cooling chamber at the end of the discharge nozzle, an outlet duct connecting the other end of the cooling chamber to the fuel injector, and multiple pressure developing devices placed in series in the line of flow of fuel to said combustion chamber to accumulate pressure in the coolant-fuel supply in steps to reach the fuel injector at the required pressure and to reduce the pressure at the inlet of the cooling chamber adjacent the discharge nozzle constriction, the first of said pressure devices being located upstream of said jacket inlet and said nozzle constriction being located adjacent a point in the jacket fuel line between said inlet pressure device and the next succeeding pressure device.

4. The apparatus as defined in claim 3 with the pressure developing means including at least two pumps, one at the inlet end and the other at the outlet end of the coolant-fuel flow through the cooling chamber.

5. A rocket-type internal combustion engine comprising a tubular combustion chamber closed at one end and having a surrounding wall, a fuel injector at said one end of said chamber, a discharge nozzle at the other end of said chamber including a constriction, an outer wall enclosing the combustion chamber wall and discharge nozzle to provide a cooling chamber, a coolant-fuel inlet to said cooling chamber at the discharge nozzle end thereof, a coolant-fuel outlet at the other end of the cooling chamber, a distributing chamber in said jacket adjacent to and communicating with said injector, a pressure developing device in said jacket inlet, and a pressure developing device in said outlet connected to said distributing chamber, whereby the pressure developed at the nozzle constriction is a fraction of the total pressure accumulated at the distributing chamber.

ROBERT C. TRUAX.

REFERENCES CITED

The following references are of record in the file of this patent:

UNITED STATES PATENTS

| Number | Name | Date |
|---|---|---|
| 2,510,571 | Goddard | June 6, 1950 |
| 2,520,751 | Zucrow | Aug. 29, 1950 |
| 2,520,967 | Schmitt | Sept. 5, 1950 |